US010659746B2

(12) United States Patent
Hada et al.

(10) Patent No.: US 10,659,746 B2
(45) Date of Patent: May 19, 2020

(54) IMAGE PROCESSING DEVICE AND IMAGE PROCESSING METHOD

(71) Applicants: Kabushiki Kaisha Toshiba, Minato-ku (JP); Toshiba Electronic Devices & Storage Corporation, Minato-ku (JP)

(72) Inventors: Ryuji Hada, Yokohama (JP); Atsushi Masuda, Yokohama (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 223 days.

(21) Appl. No.: 15/880,573

(22) Filed: Jan. 26, 2018

(65) Prior Publication Data

US 2018/0220117 A1    Aug. 2, 2018

(30) Foreign Application Priority Data

Jan. 27, 2017   (JP) ................................. 2017-012870
Aug. 31, 2017   (JP) ................................. 2017-167619

(51) Int. Cl.
*H04N 9/73* (2006.01)
*G06T 5/00* (2006.01)
*G06T 3/40* (2006.01)

(52) U.S. Cl.
CPC ........... *H04N 9/735* (2013.01); *G06T 3/4007* (2013.01); *G06T 5/006* (2013.01); *G06T 2207/10024* (2013.01)

(58) Field of Classification Search
CPC .................. G06T 5/006; G06T 3/4007; G06T 2207/10024; H04N 9/735
(Continued)

(56) References Cited

U.S. PATENT DOCUMENTS 7,364,306 B2    4/2008  Margulis
7,404,645 B2    7/2008  Margulis
(Continued)

FOREIGN PATENT DOCUMENTS

JP    2005-229200    8/2005
JP    2007-79708     3/2007
(Continued)

OTHER PUBLICATIONS

Extended European Search Report dated Jun. 13, 2018 in European Patent Application No. 18153397.7, 15 pages.
(Continued)

*Primary Examiner* — Daniel G Mariam
(74) *Attorney, Agent, or Firm* — Oblon, McClelland, Maier & Neustadt, L.L.P.

(57) ABSTRACT

The image processing device of an embodiment, to which multiple inputted pixels forming an inputted image are inputted in a raster scan order, includes a written pixel position calculating circuit configured to convert the position of each of the inputted pixels to a first pixel position in an outputted image, a read-out pixel position calculating circuit configured to convert the position of an outputted pixel near the first pixel position in the outputted image to a second pixel position in the inputted image, and a pixel interpolating circuit configured to calculate the pixel value of the second pixel position through interpolation with surrounding pixels in the inputted image.

20 Claims, 7 Drawing Sheets

(58) Field of Classification Search
USPC .................................................. 382/167, 275
See application file for complete search history.

(56) References Cited

U.S. PATENT DOCUMENTS

| | | | |
|---|---|---|---|
| 7,499,082 B2 | 3/2009 | Iga | |
| 8,279,138 B1 | 10/2012 | Margulis | |
| 8,340,462 B1 * | 12/2012 | Gigushinski | G06T 3/0093 |
| | | | 348/806 |
| 8,675,115 B1 | 3/2014 | Gigushinski et al. | |
| 8,698,701 B2 | 4/2014 | Margulis | |
| 8,724,923 B2 | 5/2014 | Nakazono et al. | |
| 9,609,197 B1 * | 3/2017 | Stepanenko | H05K 999/99 |
| 2006/0077355 A1 * | 4/2006 | Krogstad | H04N 5/74 |
| | | | 353/69 |
| 2007/0211960 A1 * | 9/2007 | Sasaki | G06T 5/006 |
| | | | 382/275 |
| 2015/0206293 A1 | 7/2015 | Kuroki | |
| 2017/0243374 A1 * | 8/2017 | Matsuzawa | G06K 9/4661 |

FOREIGN PATENT DOCUMENTS

| | | |
|---|---|---|
| JP | 2009-512896 | 3/2009 |
| JP | 2011-114381 | 6/2011 |
| JP | 2011-223367 | 11/2011 |
| JP | 2012-33007 | 2/2012 |

OTHER PUBLICATIONS

Oh, S. et al. "An architecture for on-the-fly correction of radial distortion using FPGA", Proceedings of SPIE, XP055478320, vol. 6811, Feb. 14, 2008, pp. 68110X-1-68110X-9.

* cited by examiner

US 10,659,746 B2

IMAGE PROCESSING DEVICE AND IMAGE PROCESSING METHOD

CROSS-REFERENCE TO RELATED APPLICATIONS

This application is based upon and claims the benefit of priority from the prior Japanese Patent Applications No. 2017-012870 filed in Japan on Jan. 27, 2017, and No. 2017-167619 filed in Japan on Aug. 31, 2017; the entire contents of which are incorporated herein by reference.

FIELD

Embodiments described herein relate to an image processing device and an image processing method.

BACKGROUND

In general, an image obtained by picking up an object by means of an image pickup apparatus such as a digital camera is under the influence of distortion aberration and chromatic aberration of magnification in an optical system such as an image pickup lens. In order to suppress distortion aberration, ingenuity is exercised in lens material, or an aspherical lens is used. However, the results in a problem of an increase in design or manufacturing cost. In addition, in order to suppress chromatic aberration of magnification, many lens sets made of materials having different refractive indexes are used so that the number of lenses is large. This results in a problem of an increase in the apparatus size and manufacturing cost.

Therefore, as a solution to the problems, an image processing device has been recently used which electrically corrects image distortion generated in an optical system when the image distortion, etc. is generated due to distortion aberration or chromatic aberration of magnification.

In an electrically correcting method used by a conventional image processing device, corrected outputted pixels are outputted in a raster scan order so that inputted pixel positions necessary for correction are calculated from outputted pixel positions. However, when image distortion is large, significant deviation is generated between outputted pixel positions and inputted pixel positions. Accordingly, a large number of line buffers need to be prepared to hold inputted pixels. This involves an increase in the device size. Further, a general line buffer is formed of SRAM which is expensive. Thus, a problem of an increase in the manufacturing cost exists.

BRIEF DESCRIPTION OF THE DRAWINGS

FIG. 7 is a view showing an output timing of a pixel corrected in the image processing device according to the embodiment of the present invention, in which.

DETAILED DESCRIPTION

The image processing device of the present embodiment, to which multiple inputted pixels forming an inputted image are inputted in a raster scan order, includes a first calculating circuit configured to convert, through first pixel position calculation, a position of each of the inputted pixels in the inputted image to a first pixel position in an outputted image, and a second calculating circuit configured to convert, through second pixel position calculation, a position of an outputted pixel near the first pixel position in the outputted image to a second pixel position in the inputted image. The image processing device further includes a pixel interpolating circuit configured to calculate a pixel value of the second pixel position through interpolation with a surrounding pixel in the inputted image.

Hereinafter, embodiments are described with reference to the drawings.

First Embodiment

Figure 1:
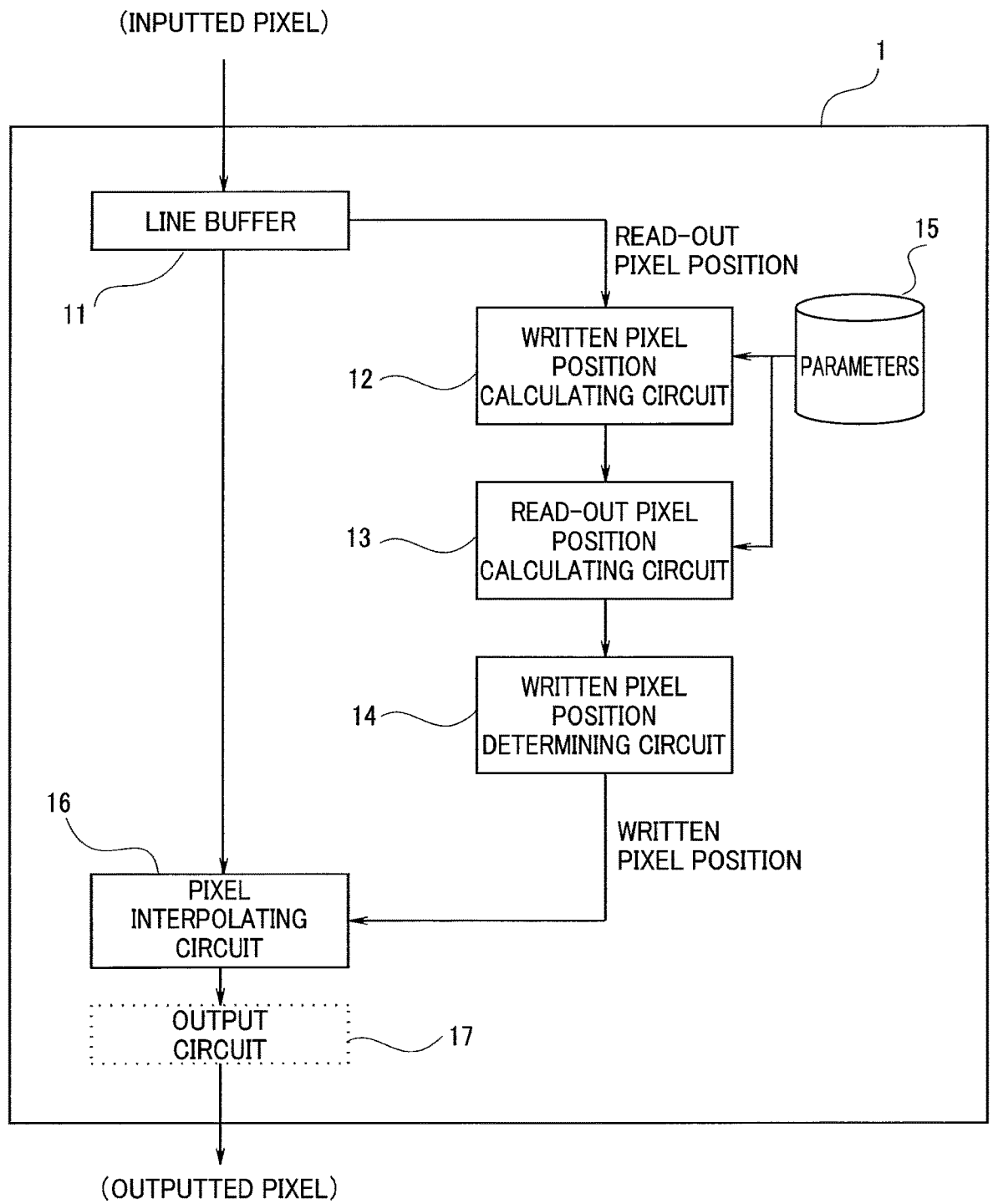
FIG. 1 is a schematic block diagram illustrating a configuration of an image processing device according to an embodiment of the present invention.

FIG. 1 is a schematic block diagram of an image processing device according to a first embodiment of the present invention. The image processing device performs electrical processing on an object image (hereinafter, referred to as an inputted image) picked up by an image pickup apparatus (not illustrated) such as a camera, and thereby corrects distortion generated in an optical system such as distortion aberration of a lens.

An image processing device 1 mainly includes a line buffer 11, a written pixel position calculating circuit 12, a read-out pixel position calculating circuit 13, a written pixel position determining circuit 14, a parameter storage circuit 15, and a pixel interpolating circuit 16.

The line buffer 11 holds, by lines necessary for a correction process, pixels (inputted pixels) of an inputted image read in a raster scan order from the image pickup apparatus. For example, in a case where distortion aberration is corrected by bilinear interpolation, the line buffer 11 holds one or two lines of pixels.

The written pixel position calculating circuit 12 as the first calculating circuit calculates a written pixel region which is predicted to include a pixel interpolated with use of a read-out pixel Pi to be corrected. More specifically, a read-out pixel position set including four surrounding pixels {Pi0 (vo, ho), Pi1 (vo, ho−1), Pi2 (vo−1, ho−1), Pi3 (vo−1, ho)} including the position (vo, ho) of the read-out pixel Pi (hereinafter, referred to as pixel Pi (vo, ho)) is defined. Note that, in a pixel position coordinate (v, h) described herein, the origin (0, 0) is set at the upper left of an image, v represents a vertical pixel position, and h represents a horizontal pixel position.

The positions (vo', ho'), (vo', ho−1'), (vo−1', ho−1'), (vo−1', ho') of written pixels Po0, Po1, Po2, Po3 corresponding to the read-out pixels Pi0, Pi1, Pi2, Pi3, respectively, are calculated by use of a function of pixel position calculation. A rectangular region, apexes of which are the four pixels Po0 (vo', ho'), Po1 (vo', ho−1'), Po2 (vo−1', ho−1'), Po3 (vo−1, ho'), is set to be the written pixel region.

As the pixel position calculation, a general function for pixel position calculation such as a function expressed by a polynomial or grid table conversion can be used. However, as the function for pixel position calculation, a function the inverse function of which exists is used.

The read-out pixel position calculating circuit 13 as the second calculating circuit extracts the position of a pixel (a written pixel candidate Poc (v', h')) at which both the vertical position and the horizontal position are integral numbers in the written pixel region. The read-out pixel position calculating circuit 13 calculates a read-out pixel Pi (v", h") corresponding to the written pixel candidate Poc (v', h'), by executing pixel position calculation. The pixel position calculation is executed by use of the inverse function of the pixel position calculation executed by the written pixel position calculating circuit 12. When the number of the candidates is two or more, the read-out pixel Pi (v", h") is calculated for each of the candidates Poc (v', h').

When the read-out pixel Pi (v", h") is included in the set, the written pixel position determining circuit 14 decides on, as a written pixel Po (v', h'), the written pixel candidate Poc (v', h') corresponding to the pixel Pi (v", h") in question.

The parameter storage circuit 15 stores parameters for the functions of pixel position calculation to be executed by the written pixel position calculating circuit 12 and the read-out pixel position calculating circuit 13.

The pixel interpolating circuit 16 calculates the pixel value of the read-out pixel Pi (v", h") corresponding to the specified written pixel Po (v', h'). The coordinate of the read-out pixel Pi (v", h") is normally a non-integer. Accordingly, the pixel value is calculated by use of an existing interpolation method such as bilinear interpolation using four surrounding pixels. The calculated pixel value is outputted as the pixel value of the written pixel Po (v', h'). The outputted pixel value is stored in a memory (not illustrated) such as DRAM. Note that outputted pixels are outputted in an order of undergoing correction, and thus, the positions of the outputted pixels are at random.

Figure 7B:
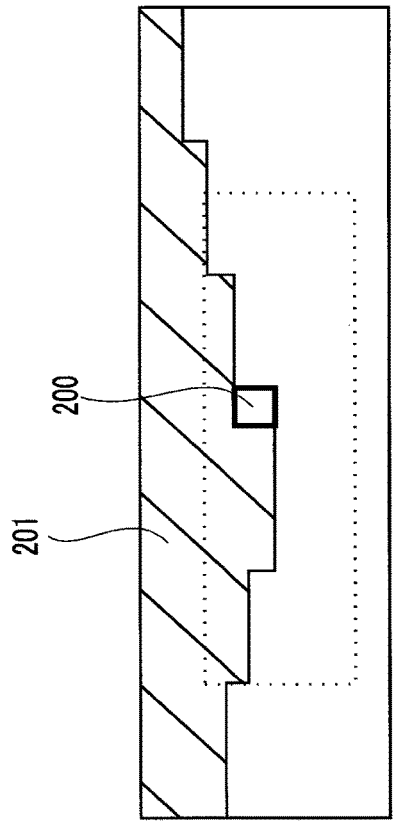
FIG. 7B illustrates an outputted pixel position in a conventional outputted image.
Figure 7C:
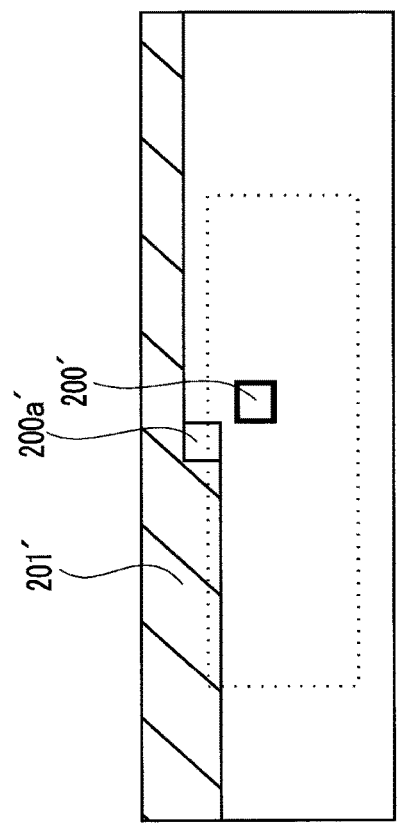
FIG. 7C illustrates an outputted pixel position in an outputted image according to the present embodiment.
Figure 7A:
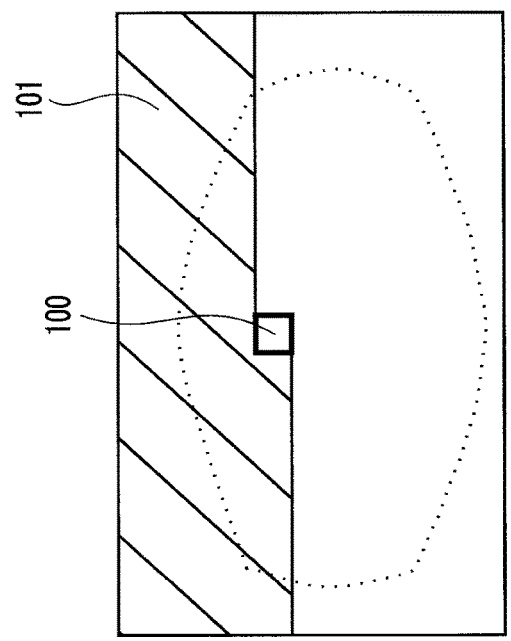
FIG. 7A illustrates an inputted pixel position in an inputted image.

FIG. 7 is a view showing an output timing of a pixel corrected in the image processing device according to the embodiment of the present invention. FIG. 7A illustrates an inputted pixel position in an inputted image. FIG. 7B illustrates an outputted pixel position in a conventional outputted image. FIG. 7C illustrates an outputted pixel position in an outputted image according to the present embodiment.

For example, as shown in FIG. 7A, pixels in an inputted image having barrel distortion aberration are read in a raster scan order, and a distortion correcting process is performed on an inputted pixel 100 located in the vicinity of substantially the center of the image. That is, the distortion correcting process is already performed on the pixels which are located in a pixel region 101 and which have been read earlier than the inputted pixel 100. In such a case, with a conventional image processing device, the pixel position after correction, which is calculated by performing the distortion correcting process on the inputted pixel 100, is a pixel 200' shown in FIG. 7B. However, in the conventional image processing device, the pixels in the outputted image after the distortion correcting process are outputted in a raster scan order, which results in a non-coincidence between a first pixel 200a' outputted from the image processing device and the pixel 200'. Note that a pixel region 201' shows a pixel region in which output of the pixels has been finished.

Specifically, the pixel 200' cannot be outputted until the correcting process in the pixel positions whose orders are before the pixel 200' in the raster scan order is finished and pixel values are calculated. Therefore, a time lag has occurred between the end of the correcting process and output of the pixel, depending on a size of distortion from the inputted pixel position, which results in a delay of the output. In particular, when the pixel value after correction is temporarily stored in a DRAM buffer, the delay time becomes long.

In contrast, in the image processing device according to the present embodiment, the pixel position after correction, which is calculated by the distortion correcting process of the inputted pixel 100, is the pixel 200 shown in FIG. 7C. Then, the pixels are outputted at random in the order in which the correcting process is performed, and the pixel 200 is outputted without delay upon calculation of the pixel value. Therefore, an image process and a process such as displaying on a display device which are performed in a subsequent stage using an outputted image can be started without delay.

Figure 2:
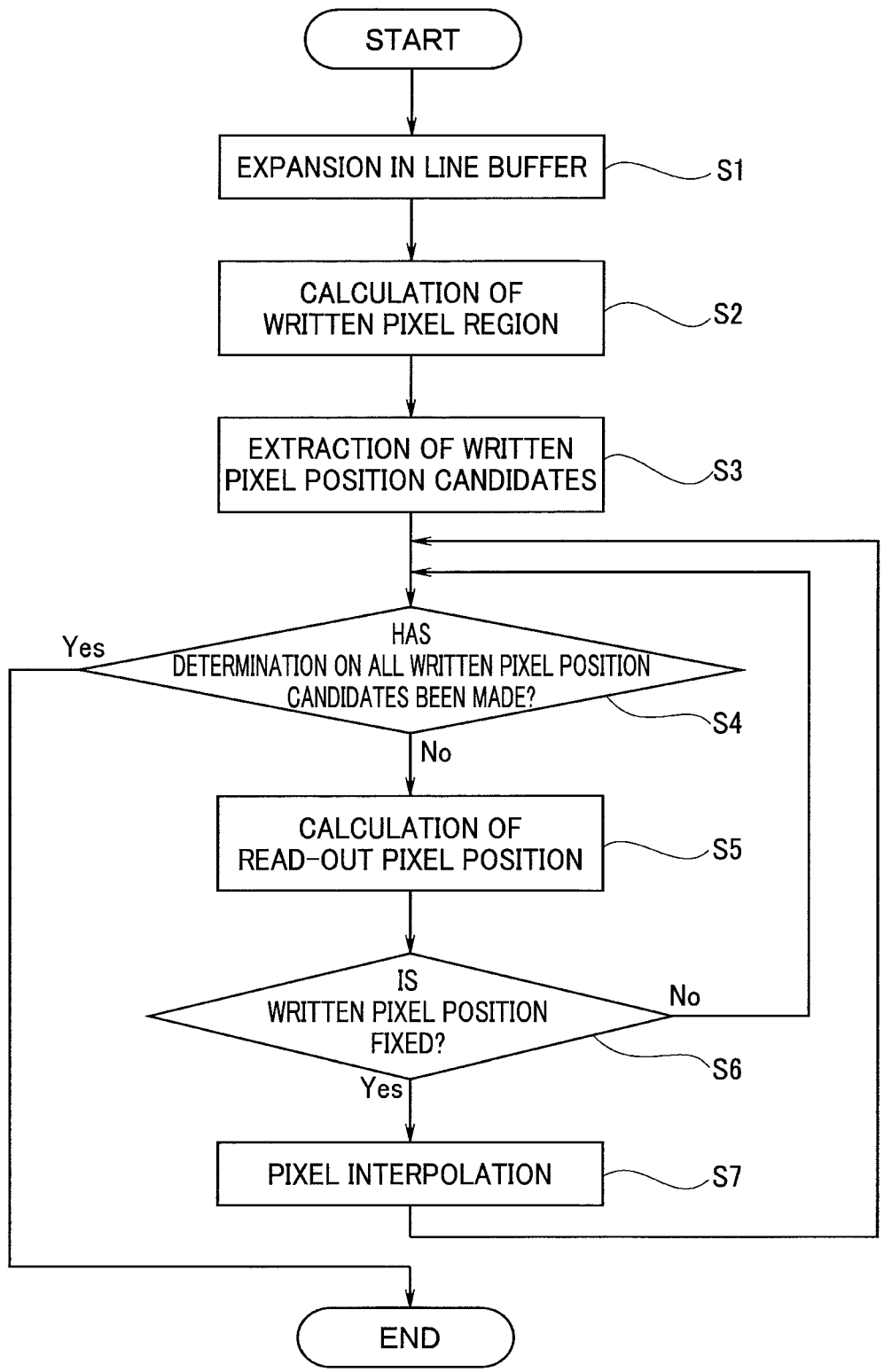
FIG. 2 is a flowchart showing an image correcting process of a first embodiment.

Next, the procedures of an image correcting process in the image processing device 1 are described. FIG. 2 is a flowchart showing an image correcting process of the first embodiment.

First, pixels inputted in a raster scan order to the image processing device 1 are expanded in the line buffer 11 (S1). The necessary number of lines of inputted pixels for a process at the pixel interpolating circuit 16 are stored in the line buffer 11. For example, when bilinear interpolation is used, the pixel values of 2×2 pixels (four pixels) surrounding a pixel to be interpolated are necessary, and thus, at least pixel values of one line+one pixel are stored.

Next, the read-out pixel Pi (vo, ho) which is a pixel to be interpolated is specified, and a written pixel region predicted to include a pixel interpolated with use of the read-out pixel Pi is calculated (S2). More specifically, a set including four surrounding pixels {Pi0 (vo, ho), Pi1 (vo, ho−1), Pi2 (vo−1, ho−1), Pi3 (vo−1, ho)} including the read-out pixel Pi (vo, ho) is defined. That is, Pi1 (vo, ho−1) represents an adjacent pixel on the left side of Pi (vo, ho), Pi2 (vo−1, ho−1) represents a pixel on the upper-left side of Pi (vo, ho), and Pi3 (vo−1, ho) represents a pixel above Pi (vo, ho). Next, pixel position calculation is executed for each of the pixels Pi0, Pi1, Pi2, Pi3, whereby corresponding written pixels Po0 (vo', ho'), Po1 (vo', ho−1'), Po2 (vo−1', ho−1'), Po3 (vo−1', ho') are calculated.

For example, when a function expressed by a polynomial is used, the pixel position calculation is executed in accordance with the following procedures.

(a) Calculation of an image height: The position of an inputted pixel is converted from the coordinate system (v, h) with the origin set at the upper left point to a coordinate system (x, y) with the origin set at the optical center. In each of the coordinate systems, the right side in the horizontal direction is positive and the lower side in the vertical direction is positive. In addition, the distance (image height) r from the optical center to the inputted pixel is calculated. The calculation is executed by Equations (1) to (3) below.

$$y = v_{in} + [\text{SENSOR\_CROP\_OFS\_}V] \tag{1}$$

$$x = h_{in} + [\text{SENSOR\_CROP\_OFS\_}H] \tag{2}$$

$$r = \sqrt{x^2 + y^2} * [\text{NORM\_SCALE}] \tag{3}$$

In Equation (1), $v_{in}$ represents the position (a non-negative number) of an inputted pixel in the vertical direction, and [SENSOR_CROP_OFS_V] represents the offset of the vertical pixel position from the optical center (a vertical offset between the optical center and the origin of the coordinate system (v, h)). In Equation (2), $h_{in}$ represents the position (a non-negative number) of an inputted pixel in the horizontal direction, and [SENSOR_CROP_OFS_H] represents the offset of the horizontal pixel position from the optical center (a horizontal offset between the optical center and the origin of the coordinate system (v, h)). In Equation (3), [NORM_SCALE] represents a normalization coefficient (a non-negative number).

When the center of an image matches the optical center, [SENSOR_CROP_OFS_V] and [SENSOR_CROP_OFS_H] satisfy the following Equations (4) and (5), respectively.

$$[SENSOR\_CROP\_OFS\_V] = -(\text{vertical size of inputted image}/2 - 0.5) \quad (4)$$

$$[SENSOR\_CROP\_OFS\_H] = -(\text{horizontal size of inputted image}/2 - 0.5) \quad (5)$$

(b) Calculation of an image height scale for pixel position calculation: A distance r_scale is calculated by which a point at a distance r from the optical center moves in a direction toward the optical center as a result of pixel position conversion. The calculation is executed by Equation (6) below.

$$r\_scale = P0 + P1*r + P2*r2 + P3*r3 \pm P4*r4 + P5*r5 + P6*r6 + P7*r7 + P8*r8 + P9*r^9 + P10*r^{10} \quad (6)$$

In Equation (6), Px (x=0 to 10) represents a polynomial coefficient according to a corresponding degree.

(c) Calculation of the position of an outputted pixel: The position of the inputted pixel is converted to the position of an outputted pixel with use of the image height scale, and the position of the outputted pixel is returned to the coordinate system (v, h). The calculation is executed by Equations (7), (8) below.

$$v_{out} = r\_scale*y - [SENSOR\_CROP\_OFS\_V] \quad (7)$$

$$h_{out} = r\_scale*x - [SENSOR\_CROP\_OFS\_H] \quad (8)$$

In Equation (7), $v_{out}$ represents the position (a non-negative number) of an outputted pixel in the vertical direction. In Equation (8), $h_{out}$ represents the position (a non-negative number) of an outputted pixel in the horizontal direction.

That is, as a result of execution of the series of procedures (a) to (c), the read-out pixels Pi (vo, ho), Pi1 (vo, ho−1), Pi2 (vo−1, ho−1), Pi3 (vo−1, ho) are converted to the written pixels Po0 (vo', ho'), Po1 (vo', ho−1'), Po2 (vo−1', ho−1'), Po3 (vo−1', ho'), respectively.

When the function expressed by the above polynomials is used as the pixel position calculation, it is assumed that the respective parameters [SENSOR_CROP_OFS_V], [SENSOR_CROP_OFS_H], [NORM_SCALE], and Px (x=0 to 10) are set in advance and stored in the parameter storage circuit 15.

Alternatively, the pixel position calculation may be executed by use of grid table conversion. A grid table refers to a 2D address table in which pixel positions (v, h) are grid nodes. In each of the grid nodes, a pixel position in a conversion destination is stored. An address corresponding to each arbitrary pixel position among grid nodes is calculated by interpolation with a near grid node. When grid table conversion is used for the pixel position calculation, the procedures are as follows.

(d) Calculation of a reference grid node: A grid node positioned at the upper left side of an inputted pixel is determined as a reference grid node. The determination is executed by the following equations (9), (10).

$$ref\_v = v_{in} * GRID\_PATCH\_VSIZE\_INV \quad (9)$$

$$ref\_h = h_{in} * GRID\_PATCH\_HSIZE\_INV \quad (10)$$

In Equation (9), $v_{in}$ represents the position (a non-negative number) of an inputted pixel in the vertical direction and GRID_PATCH_VSIZE_INV represents an inverse number of a vertical distance between grid nodes. GRID_PATCH_VSIZE_INV is calculated by Equation (11) below.

$$GRID\_PATCH\_VSIZE\_INV = \frac{1}{([SENSOR\_CROP\_VSIZE] - 1)/([GRID\_NODE\_NUM\_V] - 1)} \quad (11)$$

In Equation (11), [SENSOR_CROP_VSIZE] represents the vertical size of an inputted image, and [GRID_NODE_NUM_V] represents the number of grid nodes in the vertical direction.

In Equation (10), $h_{in}$ represents the position (a non-negative number) of an inputted pixel in the horizontal direction, and GRID_PATCH_HSIZE_INV represents an inverse number of a horizontal distance between grid nodes. GRID_PATCH_HSIZE_INV is calculated by Equation (12) below.

$$GRID\_PATCH\_HSIZE\_INV = \frac{1}{([SENSOR\_CROP\_HSIZE] - 1)/([GRID\_NODE\_NUM\_H] - 1)} \quad (12)$$

In Equation (12), [SENSOR_CROP_HSIZE] represents the horizontal size of an inputted image, and [GRID_NODE_NUM_H] represents the number of grid nodes in the horizontal direction.

(e) Calculation of a weight: The weight based on the ratio of each of the vertical and horizontal direction distances from the position of an inputted pixel to four surrounding grid nodes including the reference grid node are calculated. The calculation is executed by Equations (13), (14) below.

$$weight\_v = ref\_v - [ref\_v] \quad (13)$$

$$weight\_h = ref\_h - [ref\_h] \quad (14)$$

In Equations (13), (14), [ ] indicates a Gauss symbol. The vertical direction weight about the reference grid node is 1−weight_v. The horizontal direction weight about the reference grid node is 1−weight_h.

(f) Calculation of the position of an outputted pixel: The position of an outputted pixel is calculated through bilinear interpolation using a table of four surrounding grid nodes including the reference grid node and the respective weights of the grid nodes relative to the position of an inputted pixel.

(f-1) Calculation of the Position of an Outputted Pixel in the Vertical Direction The calculation is executed by Equations (15) to (17) below.

$$v0_{out} = table\_v(ref\_v, ref\_h)*(1 - weight\_h) + table\_v(ref\_v, ref\_h+1)*weight\_h \quad (15)$$

$$v1_{out} = table\_v(ref\_v+1, ref\_h)*(1 - weight\_h) + table\_v(ref\_v+1, ref\_h+1)*weight\_h \quad (16)$$

$$v_{out} = v0_{out}*(1 - weight\_v) + v1_{out}*weight\_v \quad (17)$$

In Equations (15), (16), table_v(v, h) represents a vertical pixel position grid table. In Equation (17), $v_{out}$ represents the position (a non-negative number) of an outputted pixel in the vertical direction.

(f-2) Calculation of the Position of an Outputted Pixel in the Horizontal Direction The calculation is executed by Equations (18) to (20) below.

$$h0_{out}=\text{table\_}h(\text{ref\_}v,\text{ref\_}h)*(1-\text{weight\_}h)+\text{table\_}h(\text{ref\_}v,\text{ref\_}h+1)*\text{weight\_}h \quad (18)$$

$$h1_{out}=\text{table\_}h(\text{ref\_}v+1,\text{ref\_}h)*(1-\text{weight\_}h)+\text{table\_}h(\text{ref\_}v+1,\text{ref\_}h+1)*\text{weight\_}h \quad (19)$$

$$h_{out}=h0_{out}*(1-\text{weight\_}h)+h1_{out}*\text{weight\_}v \quad (20)$$

In Equations (18), (19), table_h(v, h) represents a horizontal pixel position grid table. In Equation (20), $h_{out}$ represents the position of an outputted pixel (a non-negative number) in the horizontal direction.

That is, as a result of execution of the series of procedures (d) to (f), the read-out pixels Pi (vo, ho), Pi1 (vo, ho−1), Pi2 (vo−1, ho−1), Pi3 (vo−1, ho) are converted to the written pixels Po0 (vo', ho'), Po1 (vo', ho−1'), Po2 (vo−1', ho−1'), Po3 (vo−1', ho'), respectively.

When the above grid table conversion is used as the pixel position calculation, it is assumed that the respective parameters [SENSOR_CROP_VSIZE], [GRID_NODE_NUM_V], [SENSOR_CROP_HSIZE], [GRID_NODE_NUM_H], table_v(v, h), table_h(v, h) are set in advance and stored in the parameter storage circuit 15.

The rectangular region, the apexes of which are the four pixels Po0 (vo', ho'), Po1 (vo', ho−1'), Po2 (vo−1', ho−1'), Po3 (vo−1', ho') calculated by the pixel position calculation, is specified as a written pixel region.

Next, a pixel position (written pixel candidate Poc (v', h')), both the vertical coordinate and the horizontal coordinate of which are integer numbers, is extracted from the specified rectangular region. For example, the respective coordinates of the pixels Po0 (vo', ho'), Po1 (vo', ho−1'), Po2 (vo−1', ho−1'), Po3 (vo−1', ho') are rounded up/down to be adjusted and converted to be integers. All pixel positions in a rectangular region circumscribing the obtained pixel positions are defined as written pixel candidates Poc (v', h') (S3). The adjustment and conversion to integer numbers through rounding up/down are executed by Equations (21), (22) below. Equation (21) is used for the left or upper pixel of the four points, and Equation (22) is used for the right or lower pixel.

$$\text{Adjusted pixel position}=[\text{written pixel position}-\text{WRITE\_AREA\_DELTA}] \quad (21)$$

$$\text{Adjusted pixel position}=[\text{written pixel position}+\text{WRITE\_AREA\_DELTA}] \quad (22)$$

In Equations (21), (22), WRITE_AREA_DELTA represents an adjustment value for conversion to an integer, and is a preset value. [ ] represents a Gauss symbol.

Next, whether or not each of the written pixel candidates Poc (v', h') obtained at S3 is the written pixel Po (v', h') is determined. When determination on any of the written pixel candidates Poc (v', h') has not been made (No at S4), the corresponding read-out pixel Pi (v", h") is calculated through pixel position calculation (S5). In the pixel position calculation, the inverse function of the pixel position calculation at S2 is used. Here, the vertical coordinate and the horizontal coordinate of the Pi (v", h") are non-integers.

Next, pixels necessary for calculation of the pixel value of Pi (v", h") to be executed through interpolation are specified. For example, when the pixel value is calculated through bilinear interpolation, four pixels surrounding the Pi (v", h") are pixels necessary for interpolation. All the pixels necessary for interpolation are included in the set, the written pixel candidate Poc (v', h') corresponding to the read-out pixel Pi (v", h") in question is fixed as the written pixel Po (v', h') (Yes at S6).

In this case, the pixel value of the fixed written pixel Po (v', h') is calculated through pixel interpolation with the pixel value of the corresponding read-out pixel Pi (v", h"), and the calculated pixel value is outputted (S7). Outputted pixels Po (v', h') are outputted not in a raster scan order but at random. Next, returning back to S4, the presence/absence of a written pixel candidate Poc (v', h') determination of which has not made is checked.

On the other hand, the pixels necessary for interpolation include a pixel not included in the set, the written pixel candidate Poc (v', h') corresponding to the read-out pixel Pi (v", h") in question is fixed as a pixel that is not the written pixel Po (v', h') (No at S6). In this case, pixel interpolation is not executed, and the process returns back to S4 in which the presence/absence of a written pixel candidate Poc (v', h') determination of which has not been made is checked.

When determination on all the written pixel candidates Poc (v', h') obtained at S3 have been made at S4, the series of the procedures of the image correcting process is ended.

According to the present embodiment, inputted pixels read out from the image pickup apparatus in a raster scan order are subjected to a correction process in this order, as described above. Accordingly, the range of inputted pixels necessary for correction can be suppressed to only one or a few lines. Thus, the content quantity of the line buffer 11 which stores the inputted pixels can be reduced, and thus, the manufacturing cost can be suppressed.

Note that the content quantity of the line buffer 11 is set according to a pixel interpolation method. For example, approximately two lines may be contained when a bilinear method is used, whereas approximately four lines need to be contained when a bicubic method is used.

In addition, the pixel position calculation method for calculating a written pixel from a read-out pixel is not limited to the aforementioned one. That is, any arbitrary method may be used as long as an inverse function exists in the method. Alternatively, a combination of a plurality of pixel position calculation methods may be used.

In addition, an output circuit 17 is further provided, and written pixels Po (v', h'), pixel values of which are interpolated by the pixel interpolating circuit 16 may be instantly outputted one by one or by a previously set unit of plurality of pixels. Such a configuration is capable of preventing a delay of processes in another image processing device or a display device arranged in the subsequent stage of the present image processing device 1, compared with the case where pixels after correction are outputted by a unit of frame.

Second Embodiment

The image processing device of the first embodiment corrects lens distortion aberration and corrects an inputted image of a single color. In contrast, the second embodiment differs from the first embodiment in that correction of chromatic aberration of magnification is performed on a color image having three channels R, B, and G. An image processing device of the second embodiment has a configuration identical to the configuration of the first embodiment. Hereinafter, a method for an image correcting process is described. The same components and steps are denoted by the same reference numerals and the explanation of the components and steps is omitted.

Figure 3:
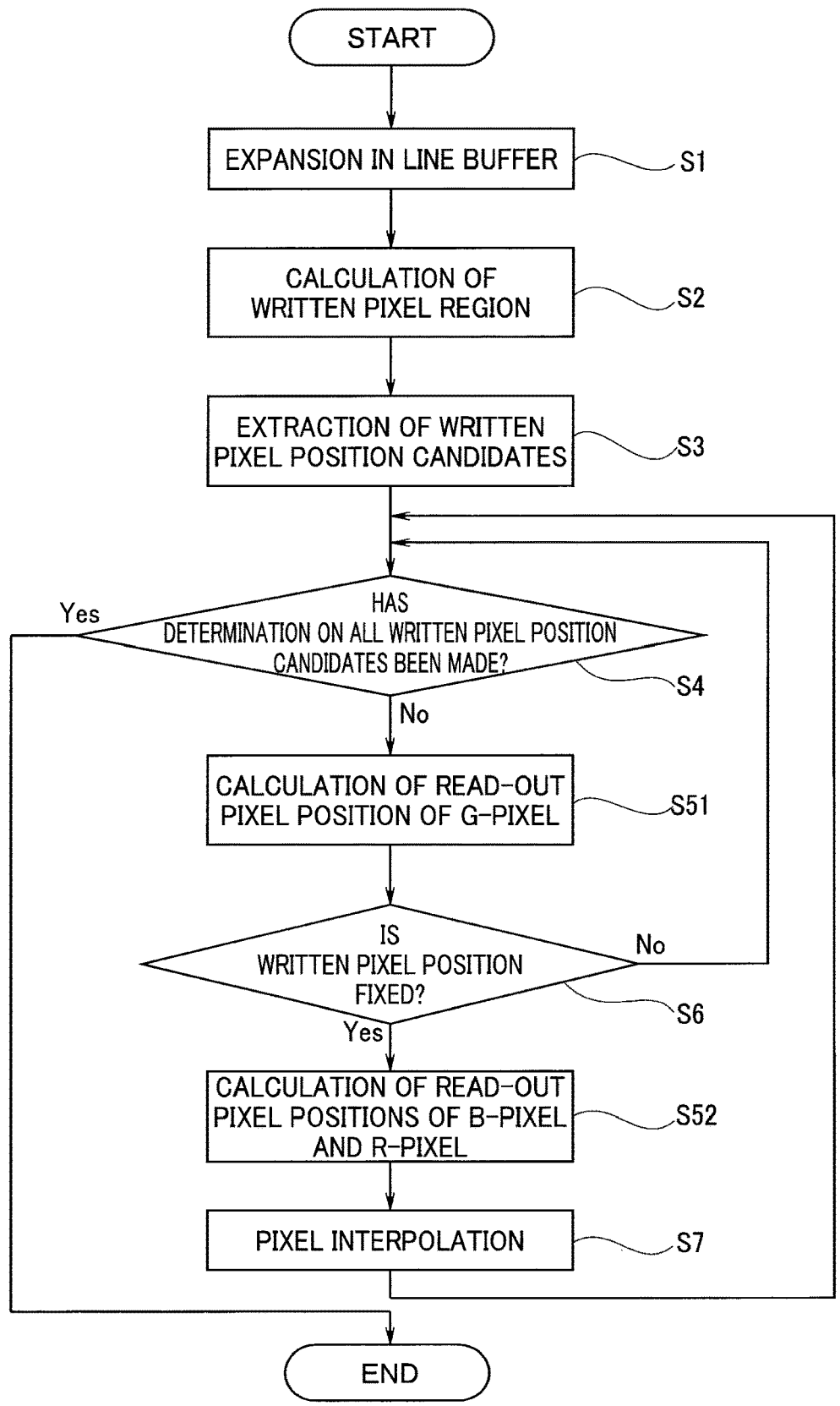
FIG. 3 is a flowchart showing an image correcting process of a second embodiment.

FIG. 3 is a flowchart showing an image correcting process according to the second embodiment. Inputted pixels of G, B, or R color pixels are separately expanded in the line buffer 11 (S1). First, a set of read-out pixel positions related to a to-be-corrected inputted G-pixel Pi_g (vo_g, ho_g) is calculated. A known pixel position calculating method is applied to the set so that a written pixel region is specified (S2). Written pixel candidates Poc h') are extracted (S3). A read-out G-pixel Pi_g (vg", hg") is calculated with use of the inverse function of the pixel position calculation used at S2 (S51).

When all pixels necessary for calculation of the pixel value of the read-out pixel Pi_g (vg", hg") to be executed through interpolation are included in the set, the written pixel candidate Poc (v', h') corresponding to the read-out pixel Pi_g (vg", hg") in question is fixed as the written pixel Po (v', h') (Yes at S6).

Next, a known pixel position calculating method is applied so that a read-out B-pixel Pi_b (vb", hb") and a read-out R-pixel Pi_r (vr", hr") are specified on the basis of the read-out G-pixel Pi_g (vg", hg") (S52). Regarding parameters for use in the pixel position calculation, parameters for use in calculation of a B-pixel based on a G-pixel and parameters for use in calculation of an R-pixel based on a G-pixel are separately set in advance.

Finally, the pixel values of respective Pi_g (vg", hg"), Pi_b (vb", hb"), Pi_r (vr", hr") are calculated through pixel interpolation, and are outputted as the pixel values of the written pixel Po (v', h') (S7). After determination and pixel value calculation through pixel interpolation have been performed on all the written pixel candidates Poc (v', h'), the pixel correcting process series is ended.

According to the present embodiment, also when correction of chromatic aberration of magnification is performed on a color image having three channels R, B, and G, inputted pixels read out from the image pickup apparatus in a raster scan order are subjected to the correction process in this order, as described above. Accordingly, the range of inputted pixels necessary for correction can be suppressed to only a few lines. Thus, the content quantity of the line buffer 11 which stores the inputted pixels can be reduced, and thus, the manufacturing cost can be suppressed.

In the above explanation, the read-out B-pixel Pi_b (vb", hb") and the read-out R-pixel Pi_r (vr", hr") are calculated on the basis of the read-out pixel Pi_g (vg", hg") of a G-pixel through pixel position calculation. Alternatively, the read-out pixels may be calculated by pixel position calculation on the basis of a written pixel Po (v', h').

In addition, any arbitrary method may be used as the pixel position calculating method as long as an inverse function exists in the method. Moreover, a combination of a plurality of pixel position calculating methods may be used. For example, chromatic aberration of magnification may be corrected with use of grid table conversion after lens distortion aberration is corrected by a function using a polynomial. In this way, multiple types of correction can be executed.

Third Embodiment

The image processing device of the first embodiment performs correction of lens distortion aberration on an inputted image, and outputs the image the distortion of which has been corrected. On the other hand, the third embodiment differs from the first embodiment in that, in the third embodiment, a pyramid process is also performed during a distortion correcting process so that a pyramid image (a collection of images with different resolutions of the same image) is further generated.

Figure 4:
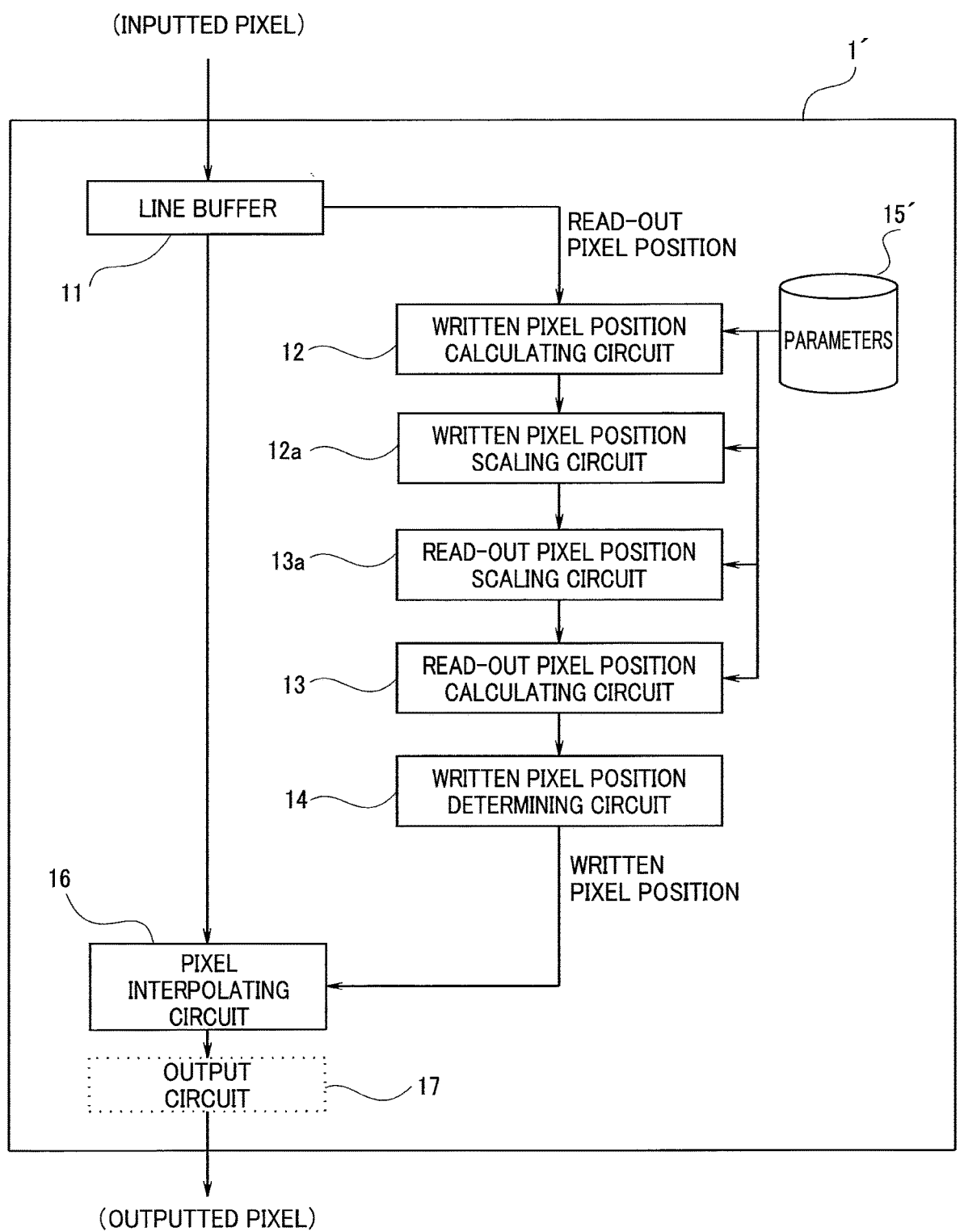
FIG. 4 is a schematic block diagram illustrating a configuration of an image processing device according to a third embodiment.

FIG. 4 is a schematic block diagram of an image processing device according to the third embodiment. Note that components identical to the components of the image processing device of the first embodiment are denoted by the same reference numerals and the explanation the components is omitted.

A written pixel position scaling circuit 12a calculates a written pixel region predicted to include a pixel having undergone a pyramid process by multiplying, with a prescribed scale, a pixel obtained by performing interpolation with a read-out pixel Pi to be corrected. More specifically, the written pixel position scaling circuit 12a multiplies each of the pixels Po0 (vo', ho'), Po1 (vo', ho-1'), Po2 (vo-1', ho-1'), Po3 (vo-1', ho') at the apexes of the written pixel region calculated by the written pixel position calculating circuit 12, with a prescribed scale for generating a pyramid image. Accordingly, pixels Po0 (vo_s', ho_s'), Po1 (vo_s', ho-1_s'), Po2 (vo-1_s', ho-1_s'), Po3 (vo-1_s', ho_s') at the apexes of the written pixel region in the pyramid image are calculated.

A read-out pixel position scaling circuit 13a extracts the position of a pixel (written pixel candidate Poc (v_s', h_s')), both the vertical position and the horizontal position of which are integers in the written pixel region of the pyramid image calculated by the written pixel position scaling circuit 12a. Subsequently, the read-out pixel position scaling circuit 13a converts the extracted position to a written pixel position in an outputted image of the same magnification by multiplying the extracted position with the inverse number of the prescribed scale. A read-out pixel Pi (v_s", h_s") corresponding to the written pixel candidate Poc (v_s', h_s') is calculated by pixel position calculation. Note that the pixel position calculation is executed with use of an inverse function of the pixel position calculation executed by the written pixel position calculating circuit 12. When the number of the candidates is two or more, a read-out pixel Pi (v_s", h_s") is calculated for each of the candidates Poc (v_s', h_s').

Not only parameters for use in the pixel position calculation to be executed by the written pixel position calculating circuit 12 and the read-out pixel position calculating circuit 13, but also scales of a pyramid image to be generated are stored in a parameter storage circuit 15'. When pyramid images of multiple scales are generated, the multiple scales corresponding to respective images are stored.

Figure 5:
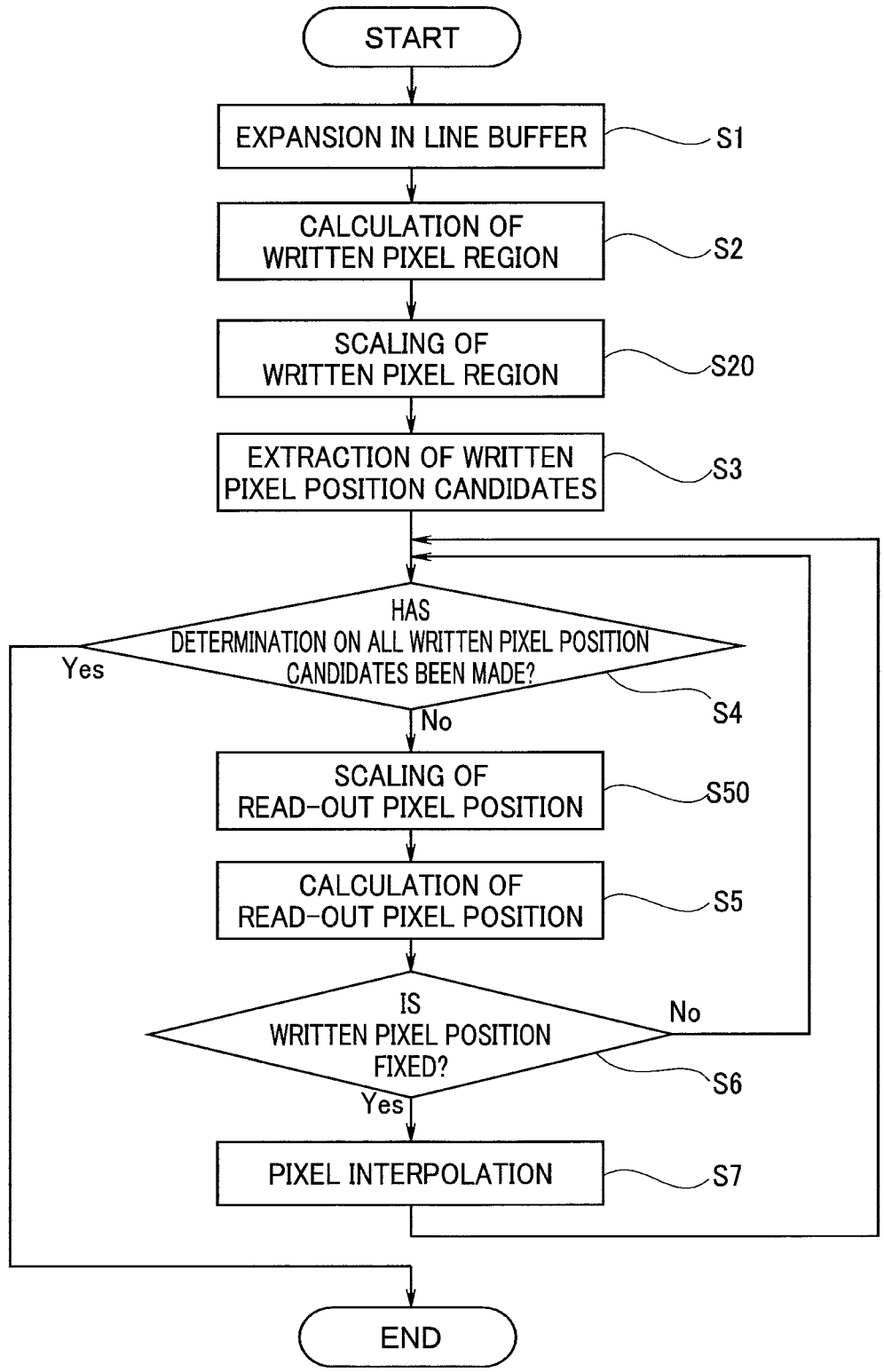
FIG. 5 is a flowchart showing an image correcting process of the third embodiment.

Next, an image processing method of the present embodiment is described. FIG. 5 is a flowchart showing an image correcting process of the third embodiment. Note that steps identical to the steps in the image processing method of the first embodiment are denoted by the same reference characters and the explanation the steps is omitted.

First, pixels inputted in a raster scan order to an image processing device 1' are expanded in the line buffer 11 (S1). Next, a read-out pixel Pi (vo, ho) which is a pixel to be corrected is specified, and a written pixel region predicted to include a pixel interpolated with the read-out pixel Pi is calculated (S2). As the pixel position calculation, a function expressed by a polynomial or grid table conversion can be used. Further, grid table conversion may be additionally used for the result calculated by a function expressed by a polynomial, or a function expressed by a polynomial may be additionally used for the result calculated by grid table conversion.

Next, a written pixel region corresponding to a pyramid image of a predetermined scale is calculated (S20). When a function expressed by a polynomial is used as the pixel position calculation, the image height scale (r_scale) of pixel position calculation calculated at S2 is re-scaled according to the scale of the pyramid image. More specifically, re-scaling is executed by Equation (23) below.

$$r\_scale\_scaled = r\_scale * scale \quad (23)$$

In Equation (23), scale represents a scaling value of a pyramid image with respect to an outputted image on which only normal distortion correction is performed. It is assumed that the scaling value is set in advance and is stored in the parameter storage circuit 15'. The scaling value is generally set to approximately 0.5 to 2.

Next, the image height scale scaled for a pyramid image is returned into the coordinate system (v, h) by use of Equations (7), (8). However, r_scale_scaled is substituted for r_scale in each of Equations (7), (8). In this way, the read-out pixels Pi (vo, ho), Pi1 (vo, ho−1), Pi2 (vo−1, ho−1), Pi3 (vo−1, ho) are converted to written pixels Po0 (vo_s', ho_s'), Po1 (vo_s', ho−1_s'), Po2 (vo−1_s', ho−1_s'), Po3 (vo−1_s', ho_s'), respectively.

When pixel position calculation is executed by use of grid table conversion, the horizontal coordinate position and the vertical coordinate position of each of the written pixels Po0 (vo', ho'), Po1 (vo', ho−1'), Po2 (vo−1', ho−1'), Po3 (vo−1', ho') calculated at S2 are multiplied with the scale of the pyramid image. More specifically, by Equations (24), (25), the position of the written pixel is converted from the coordinate system (v, h) with the origin set at the upper left to the coordinate system (x, y) with the origin set at the optical center.

$$x = h_{out} + [SENSOR\_CROP\_OFS\_H] \quad (24)$$

$$y = v_{out} + [SENSOR\_CROP\_OFS\_V] \quad (25)$$

The converted coordinate position is re-scaled with the scale of the pyramid image. More specifically, re-scaling is executed by Equations (26), (27) below.

$$x\_scaled = x * scale \quad (26)$$

$$y\_scaled = y * scale \quad (27)$$

At last, the coordinate position scaled for a pyramid image is returned into the coordinate system (v, h) with the origin set at the upper left. In this way, the read-out pixels Pi (vo, ho), Pi1 (vo, ho−1), Pi2 (vo−1, ho−1), Pi3 (vo−1, ho) are converted to written pixels Po0 (vo_s', ho_s'), Po1 (vo_s', ho−1_s'), Po2 (vo−1_s', ho−1_s'), Po3(vo−1_s', ho_s'), respectively.

That is, in both a case where a function expressed by a polynomial is used as the pixel position calculation and a case where grid table conversion is used as the pixel position calculation, the rectangular region, the apexes of which are the four pixels Po0 (vo_s', ho_s'), Po1 (vo_s', ho−1_s'), Po2 (vo−1_s', ho−1_s'), Po3 (vo−1_s', ho_s'), can be specified as a written pixel region in the pyramid image, by use of the result of calculation at S2 or the interim progress of the calculation.

When a pyramid image of multiple scales is generated, S20 is repeatedly executed so that written pixel regions corresponding to the respective scales are specified.

Next, the positions of pixels (written pixel candidates Poc (v', h')), both the vertical coordinate and the horizontal coordinate of which are integers, are extracted from the respective rectangular regions (written pixel regions) specified as a result of execution of S2 and S20 (S3). Next, whether or not each of the written pixel candidates Poc (v', h') obtained at S3 is a written pixel Po (v', h') is determined. When determination on any of the written pixel candidates Poc (v', h') has not been made (No at S4), the corresponding read-out pixel Pi (v'', h'') is calculated by pixel position calculation (S5). At S5, corresponding read-out pixels are calculated for the written pixel candidates corresponding to the written pixel regions specified at S2.

Prior to the pixel position calculation at S5, the written pixel candidates Poc (v', h) corresponding to a written pixel region scaled for a pyramid image and specified at S20 are multiplied with the inverse numbers of the scales used for the corresponding written pixel candidates at S20, and thus, are converted to written pixel positions in an outputted image of the same magnification (S50). Next, the pixel position of a read-out pixel for the converted pixel position is calculated by use of an inverse function of the pixel position calculation at S20 (S5). Note that both the vertical coordinate and the horizontal coordinate of Pi (v'', h'') calculated at S5 are non-integers.

Next, pixels necessary for calculation of the pixel value of Pi (v'', h'') to be executed by interpolation are specified. For example, when the pixel value is calculated through bilinear interpolation, four pixels surrounding Pi (v'', h'') are necessary for interpolation. When all the pixels necessary for interpolation are included in the set, the written pixel candidate Poc (v', h') corresponding to the read-out pixel Pi (v'', h'') in question is fixed as the written pixel Po (v', h') (Yes at S6).

In this case, the pixel value of the fixed written pixel Po (v', h') is calculated through pixel interpolation with the pixel value of the corresponding read-out pixel Pi (v'', h''), and is outputted (S7). Note that the outputted pixels Po (v', h') are outputted not in a raster scan order but at random. Next, returning back to S4, the presence/absence of a written pixel candidate Poc (v', h') determination of which has not been made is checked.

On the other hand, when the pixels necessary for interpolation include a pixel not included in the set, the written pixel candidate Poc (v', h') corresponding to the read-out pixel Pi (v'', h'') in question is fixed as a pixel that is not the written pixel Po (v', h') (No at S6). In this case, pixel interpolation is not executed and the process returns back to S4 in which the presence/absence of a written pixel candidates Poc (v', h') determination of which has not been made is checked.

When determination on all the written pixel candidates Poc (v', h') obtained at S3 have been made at S4, the series of the procedures of the image correcting process is ended.

Note that, after the written pixel region in the distortion-corrected outputted image of the same magnification is calculated at S2, the order of calculation procedures can be rearranged or parallel calculation can be executed because the scaling procedures for the pyramid image are not dependent on one another. For example, when a pyramid image of multiple scales is generated, either the scaling step S20 or S50 may be executed first. Further, after an outputted image of the same magnification is generated, a scale image may be generated on the basis of the result of calculation at S2.

According to the present embodiment, inputted pixels read out from the image pickup apparatus in a raster scan order are corrected in the raster scan order, as described above. Accordingly, the range of inputted pixels necessary for correction can be suppressed to only one or a few lines.

Thus, the content quantity of the line buffer 11 which stores the inputted pixels can be reduced, and thus, the manufacturing cost can be suppressed.

In addition, according to the present embodiment, the pixel position calculation for generating a pyramid image is executed to be included in pixel position calculation during the distortion correcting process. Hence, compared to a case where a pyramid image is generated by scaling of a distortion-corrected image, the number of sampling interpolation processes is reduced. Thus, deterioration in the image quality of the pyramid image can be suppressed. Moreover, since a distortion-corrected image written in the memory does not need to be read out for generation of a pyramid image, an access time to the memory can be reduced and the process time can be shortened.

Note that the pixel position calculating method for calculating a written pixel from a read-out pixel is not limited to the aforementioned method. That is, any arbitrary method may be used as long as an inverse function exists in the method. Alternatively, a combination of a plurality of pixel position calculation methods may be used.

In addition, similarly in the image processing device according to the first embodiment, an output circuit 17 is further provided, and written pixels Po (v', h'), pixel values of which are interpolated by the pixel interpolating circuit 16 may be instantly outputted one by one or by a previously set unit of plurality of pixels. Such a configuration is capable of preventing a delay of processes in another image processing device or a display device arranged in the subsequent stage of the present image processing device 1, compared with the case where pixels after correction are outputted by unit of frame.

Fourth Embodiment

The image processing device of the third embodiment generates a pyramid image during the correction process of lens distortion aberration or correction of a single-color inputted image. In contrast, the fourth embodiment differs from the third embodiment in that, in the fourth embodiment, a pyramid image of a color image having three channels R, B, G is generated during correction of chromatic aberration of magnification. An image processing device of the fourth embodiment has a configuration identical to the configuration of the third embodiment. Hereinafter, a method for an image correcting process is described. The same components and steps are denoted by the same reference numerals and the explanation of the components and steps is omitted.

Figure 6:
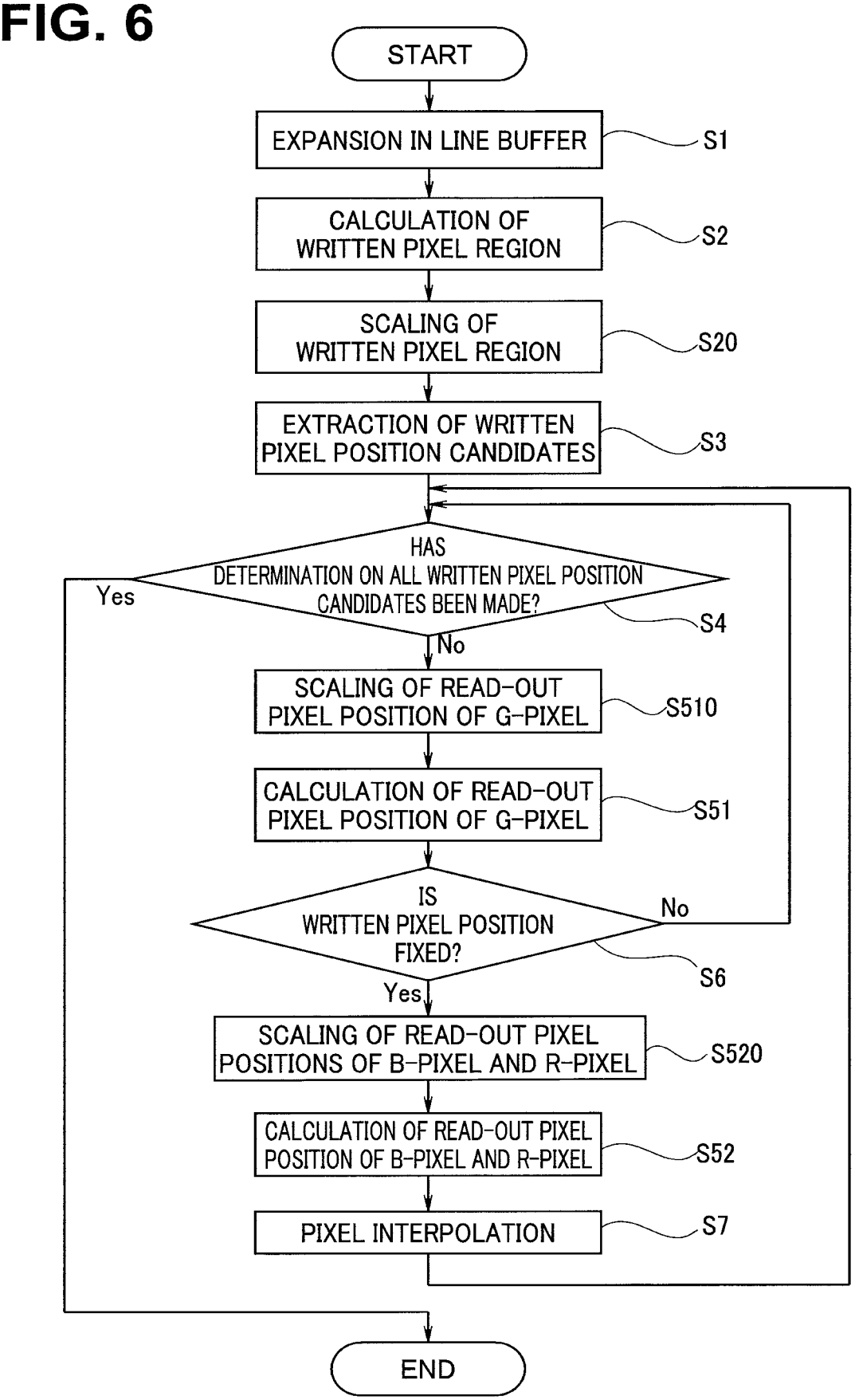
FIG. 6 is a flowchart showing an image correcting process of a fourth embodiment.

FIG. 6 is a flowchart showing image correcting processes of the fourth embodiment. Inputted pixels of color pixels G, B, R are separately expanded in the line buffer 11 (S1). First, a read-out pixel position set about a to-be-corrected inputted G-pixel Pi_g (vo_g, ho_g) is calculated. A known pixel position calculating method is applied to the set, and thus, a written pixel region is specified (S2). Next, a written pixel region corresponding to a pyramid image of a predetermined scale is specified (S20), and written pixel candidates Poc (v', h') are extracted from the written pixel regions specified at S2 and S20 (S3).

Next, whether or not each of the written pixel candidate Poc (v', h') obtained at S3 is the written pixel Po (v', h') is determined. When determination on any of the written pixel candidates Poc (v', h') has not been made (No at S4), the read-out G-pixel Pi_g (vg", hg") is calculated by use of the inverse function of the pixel position calculation used at S2 (S51). Note that, at S5, corresponding read-out pixel are calculated for the written pixel candidates corresponding to the written pixel region specified at S2.

Prior to the pixel position calculation at S5, the written pixel candidates Poc (v', h') corresponding to the written pixel region scaled for a pyramid image and specified at S20 are multiplied with the inverse number of the scale used for the written pixel candidates at S20, so as to be converted to the written pixel positions in an outputted image of the same magnification (S510). Next, the corresponding read-out G-pixel Pi_g (vg", hg") is calculated (S51).

When all pixels necessary for calculation of the pixel value of the read-out pixel Pi_g (vg", hg") to be executed by interpolation are included in the set, the written pixel candidate Poc (v', h') corresponding to the read-out pixel Pi_g (vg", hg") in question is fixed as the written pixel Po (v', h') (Yes at S6).

Next, a known pixel position calculating method is applied so that a read-out B-pixel Pi_b (vb", hb") and a read-out R-pixel Pi_r (vr", hr") are specified on the basis of the read-out G-pixel Pi_g (vg", hg") calculated at S51 (S52). Here, parameters for use in the pixel position calculation are set in advance separately as parameters for use in calculation of a B-pixel from a G-pixel and as parameters for use in calculation of an R-pixel from a G-pixel.

Note that, after the read-out G-pixel Pi_g (vg", hg") in the pyramid image is scaled with the predetermined scale used at S20 (S520), the read-out B-pixel Pi_b (vb", hb") and the read-out R-pixel Pi_r (vr", hr") are specified (S52).

Finally, each of Pi_g (vg", hg"), Pi_b (vb", hb"), and Pi_r (vr", hr") is subjected to pixel interpolation so that the pixel values are calculated, and the calculated pixel values are outputted as pixel values of the written pixel Po (v', h') (S7). When decision determination and pixel value calculation by pixel interpolation have been performed on all the written pixel candidates Poc (v', h'), the pixel correcting process series is ended.

Note that, after the written pixel region in the outputted image of the same magnification is calculated at S2, the order of the calculation procedures can be rearranged or parallel calculation can be executed because the respective scaling procedures for a pyramid image are not dependent on one another. For example, when a pyramid image of multiple scales is generated, any one of the scaling steps S20, S510, and S520 may be executed first. Further, after an outputted image of the same magnification is generated, a scale image may be generated on the basis of the result of calculation at S2.

According to the present embodiment, also when correction of chromatic aberration of magnification is performed on a color image of three channels R, B, G, inputted pixels read out from the image pickup apparatus in a raster scan order are corrected in the raster scan order, as described above. Accordingly, the range of inputted pixels necessary for correction can be suppressed to only a few lines. Thus, the content quantity of the line buffer 11 which stores the inputted pixels can be reduced, and thus, the manufacturing cost can be suppressed.

In addition, according to the present embodiment, pixel position calculation for generating a pyramid image is also included in pixel position calculation during correction of chromatic aberration of magnification. Hence, compared to a case where a pyramid image is generated by scaling of a corrected image, the number of sampling interpolation processes is reduced. Thus, deterioration in the image quality of the pyramid image can be suppressed. Moreover, since a distortion-corrected image written in the memory does not need to be read out for generation of a pyramid image, an access time to the memory can be reduced and the process time can be shortened.

The respective "circuits" herein refer to concepts corresponding to the respective functions in the embodiments, and are not necessarily in one-to-one correspondence with specific hardware or software routines. Therefore, the description has been given herein in which virtual circuit blocks (circuits) having respective functions in the embodiments are assumed as the circuits.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An image processing device to which multiple inputted pixels forming an inputted image are inputted in a raster scan order, the image processing device comprising:
   a first calculating circuit configured to convert, through first pixel position calculation, a position of each of the inputted pixels in the inputted image to a first pixel position in an outputted image;
   a second calculating circuit configured to convert, through second pixel position calculation, an outputting pixel position at which a position of an outputted pixel near the first pixel position in the outputted image is an integer to a second pixel position in the inputted image;
   an adjusting circuit configured to perform adjustment such that the second pixel position calculation is an inverse function of the first pixel position calculation; and
   a pixel interpolating circuit configured to calculate a pixel value of the second pixel position, through interpolation with a surrounding pixel in the inputted image, and set the calculated pixel value as a pixel value of the outputted pixel.

2. The image processing device according to claim 1, further comprising a line buffer configured to store the inputted pixels.

3. The image processing device according to claim 2, wherein
   the first pixel position calculation is a function using a polynomial, grid table conversion, or a combination of the function using a polynomial and the grid table conversion, and
   the second pixel position calculation is executed with use of an inverse function of the first pixel position calculation.

4. The image processing device according to claim 2, wherein
   the inputted pixels include multiple color pixels,
   the image processing device further comprising a third calculating circuit configured to convert the first pixel position or the second pixel position calculated with use of one of the color pixels, to the second pixel position of another one of the color pixels.

5. The image processing device according to claim 1, wherein
   the first pixel position calculation is a function using a polynomial, grid table conversion, or a combination of the function using a polynomial and the grid table conversion, and
   the second pixel position calculation is executed with use of an inverse function of the first pixel position calculation.

6. The image processing device according to claim 1, wherein
   the inputted pixels include multiple color pixels,
   the image processing device further comprising a third calculating circuit configured to convert the first pixel position or the second pixel position calculated with use of one of the color pixels, to the second pixel position of another one of the color pixels.

7. The image processing device according to claim 1, further comprising an output circuit configured to be capable of outputting corrected pixels, pixel values of which are interpolated by the pixel interpolating circuit, one by one or by a unit of plurality of pixels.

8. An image processing method comprising:
   inputting inputted pixels forming an inputted image in a raster scan order;
   converting, through first pixel position calculation, a position of each of the inputted pixels to a first pixel position in an outputted image;
   performing adjustment such that a second pixel position calculation for converting a position which is an integer of an outputted pixel near the first pixel position which is a non-integer in the outputted image to a second pixel position in the inputting image is an inverse function of the first pixel position calculation;
   converting the position which is the integer of the outputted pixel near the first pixel position to the second pixel position through the second pixel position calculation;
   calculating a pixel value of the second pixel position through interpolation with a surrounding pixel in the inputted pixel; and
   outputting the pixel value of the second pixel position as a pixel value of the outputted pixel in an order in which the pixel value is calculated through the interpolation.

9. The image processing method according to claim 8, wherein
   the inputted image is formed of multiple color pixels, and
   the first pixel position or the second pixel position calculated with use of one of the color pixels is converted to the second pixel position of another one of the color pixels.

10. The image processing method according to claim 8, further comprising:
   converting the first pixel position in the outputted image to a third pixel position in a pyramid image of the outputted image with use of a prescribed scaling value, after converting the position of the inputted pixel to the first pixel position through pixel position calculation;
   converting the position of an outputted pixel near the third pixel position in the pyramid image to a fourth pixel position with use of the prescribed scaling value and an inverse function of the pixel position calculation;
   calculating a pixel value of the fourth pixel position by interpolation with a surrounding pixel in the inputted image; and outputting the pixel value of the fourth pixel position in an order of in which the pixel value is calculated through the interpolation.

11. The image processing method according to claim 10, wherein
the inputted image is formed of multiple color pixels, and
the first pixel position or the second pixel position calculated with use of one of the color pixels is converted to the second pixel position of another one of the color pixels, and the third pixel position or the fourth pixel position calculated with use of one of the color pixels is converted to the fourth pixel position of another one of the color pixels.

12. An image processing device to which multiple inputted pixels forming an inputted image are inputted in a raster scan order, the image processing device comprising:
a first calculating circuit configured to convert, through first pixel position calculation, a position of each of the inputted pixels in the inputted image to a first pixel position in an outputted image;
a second calculating circuit configured to convert, through second pixel position calculation, a position of an outputted pixel near the first pixel position in the outputted image to a second pixel position in the inputted image;
a pixel interpolating circuit configured to calculate a pixel value of the second pixel position through interpolation with a surrounding pixel in the inputted image;
a fourth calculating circuit configured to convert the first pixel position in the outputted image to a third pixel position in a pyramid image of the outputted image with use of a prescribed scaling value; and
a fifth calculating circuit configured to convert, through the second pixel position calculation with the prescribed scaling value, a position of an outputted pixel near the third pixel position in the pyramid image to a fourth pixel position in the inputted image, wherein
the pixel interpolating circuit calculates a pixel value of the second pixel position and a pixel value of the fourth pixel position through interpolation with respective surrounding pixels in the inputted image.

13. The image processing device according to claim 12, further comprising a line buffer configured to store the inputted pixels.

14. The image processing device according to claim 13, wherein
the first pixel position calculation is a function using a polynomial, grid table conversion, or a combination of the function using a polynomial and the grid table conversion, and
the second pixel position calculation is executed with use of an inverse function of the first pixel position calculation.

15. The image processing device according to claim 13, wherein
the fourth calculating circuit calculates the third pixel position in plurality corresponding to the scaling value in plurality different from one other, and the fifth calculating circuit calculates the fourth pixel position in plurality corresponding to the scaling value in plurality different from one another.

16. The image processing device according to claim 13, wherein
the inputted pixels include multiple color pixels,
the image processing device further comprising a sixth calculating circuit configured to convert the first pixel position or the second pixel position calculated with use of one of the color pixels, to the second pixel position of another one of the color pixels, and to convert the third pixel position or the fourth pixel position calculated with use of one of the color pixels, to the fourth pixel position of another one of the color pixels.

17. The image processing device according to claim 12,
the first pixel position calculation is a function using a polynomial, grid table conversion, or a combination of the function using a polynomial and the grid table conversion, and
the second pixel position calculation is executed with use of an inverse function of the first pixel position calculation.

18. The image processing device according to claim 12, wherein
the fourth calculating circuit calculates the third pixel position in plurality corresponding to the scaling value in plurality different from one other, and the fifth calculating circuit calculates the fourth pixel position in plurality corresponding to the scaling value in plurality different from one another.

19. The image processing device according to claim 12, wherein
the inputted pixels include multiple color pixels,
the image processing device further comprising a sixth calculating circuit configured to convert the first pixel position or the second pixel position calculated with use of one of the color pixels, to the second pixel position of another one of the color pixels, and to convert the third pixel position or the fourth pixel position calculated with use of one of the color pixels, to the fourth pixel position of another one of the color pixels.

20. The image processing device according to claim 12, further comprising an output circuit configured to be capable of outputting corrected pixels, pixel values of which are interpolated by the pixel interpolating circuit, one by one or by a unit of plurality of pixels.

* * * * *